(12) United States Patent
Lin et al.

(10) Patent No.: US 9,039,296 B2
(45) Date of Patent: May 26, 2015

(54) FIBER OPTIC CONNECTOR STRUCTURE

(71) Applicant: Foci Fiber Optic Communications, Inc., Hsinchu (TW)

(72) Inventors: Song-Fure Lin, Hsinchu (TW); Archer Shu, Hsinchu (TW); Pinsung Wang, Zhubei (TW); Chunying Kung, Zhubei (TW)

(73) Assignee: Foci Fiber Optic Communications, Inc., Hsinchu (TW)

( * ) Notice: Subject to any disclaimer, the term of this patent is extended or adjusted under 35 U.S.C. 154(b) by 0 days.

(21) Appl. No.: 14/047,395

(22) Filed: Oct. 7, 2013

(65) Prior Publication Data

US 2014/0105541 A1 Apr. 17, 2014

(30) Foreign Application Priority Data

Oct. 17, 2012 (TW) .............................. 101138302 A (51) Int. Cl.
*G02B 6/36* (2006.01)
*G02B 6/38* (2006.01)

(52) U.S. Cl.
CPC ............ *G02B 6/3838* (2013.01); *G02B 6/3806* (2013.01); *G02B 6/3846* (2013.01)

(58) Field of Classification Search
CPC .... G02B 6/382; G02B 6/3838; G02B 6/3846; G02B 6/3858
USPC .......................................... 385/62, 65, 81, 83
See application file for complete search history.

(56) References Cited

U.S. PATENT DOCUMENTS

| | | | | |
|---|---|---|---|---|
| 5,159,655 A * | 10/1992 | Ziebol et al. | ..................... | 385/81 |
| 5,943,460 A * | 8/1999 | Mead et al. | ..................... | 385/81 |
| 5,993,070 A * | 11/1999 | Tamekuni et al. | .............. | 385/65 |
| 6,234,685 B1 * | 5/2001 | Carlisle et al. | .................. | 385/83 |

* cited by examiner

*Primary Examiner* — Ryan Lepisto
(74) *Attorney, Agent, or Firm* — Alan D. Kamrath; Kamrath IP Lawfirm, P.A.

(57) ABSTRACT

A fiber optic connector structure contains a base, a covering member, and a fitting sleeve. The base includes a holding face, two contacting portions, and at least one slot. A respective one of the at least one slot has an opening and has a bottom portion. The bottom portion of the respective one of the at least one slot has at least one notch, and a respective one of the at least one notch has a first inserting segment and a second inserting segment. The covering member includes two resilient extensions corresponding to the two contacting portions and a sliding block sliding from the opening to the bottom portion. The fitting sleeve is fitted on the base and the covering member, and provides a force on the sliding block, so that the sliding block retains the fiber stub and the field fiber.

9 Claims, 11 Drawing Sheets

FIBER OPTIC CONNECTOR STRUCTURE

BACKGROUND OF THE INVENTION

1. Field of the Invention

The present invention relates to a fiber optic connector structure and, more particularly, to a fiber optic connector structure which is used to connect optical fibers at a construction site.

2. Description of the Prior Art

An optical fiber can transmit signals quickly, can separate electromagnetic noises, and can avoid signal loss at high bandwidth. A conventional fiber optic connector is fixed in a fiber optic terminal device to be served as a connecting part of optical paths while connecting optical fibers together.

For easy construction, a conventional fiber optic connector can be operated at a construction site after assembling the fiber optic connector at the factory. Such a fiber optic connector is used to retain a fiber stub which is assembled at the factory beforehand and a field fiber which is assembled at the scene. As shown in FIGS. 1, 1A, 2, 2A, 3 and 3A, three conventional fiber optic connector structures contain a fixing member A, a retaining piece B, and a locking member C. The fixing member A includes a fix face A1 on which a notch A2 is defined to insert a fiber stub D which is assembled at the factory beforehand and a field fiber E which is assembled at the scene. Thereafter, the fiber stub D is aligned and connected with the field fiber E. In addition, between the fiber stub D and the field fiber E is fed a matching fluid F to prevent optical signal loss from connecting the fiber stub D and the field fiber E together. The retaining piece B is covered on the fixing member A or is integrally formed with the fixing member A. The retaining piece B includes a clamping face B1 opposite to the fix face A1. Between the clamping face B1 and the fix face A1 is defined a gap G communicating with exterior environment. The locking member C is fitted on the fixing member A and the retaining piece B and provides a force to the clamping face B1 of the retaining piece B and the fix face A1 of the fixing member A, so that the clamping face B1 retains the fiber stub D and the field fiber E in the notch A2.

However, the matching fluid F leaks and evaporates from the gap G easily, so a loss of the optical signals between the fiber stub D and the field fiber E increases easily. Also, when the locking member C provides the force to the clamping face B1 of the retaining piece B and the fix face A1 of the fixing member A, the conventional fiber optic connector structures cannot be calibrated, and the clamping face B1 cannot retain the fiber stub D and the field fiber E evenly, so the fiber stub D and the field fiber E cannot align and connect with each other precisely.

The present invention has arisen to mitigate and/or obviate the afore-described disadvantages.

SUMMARY OF THE INVENTION

The primary objective of the present invention is to provide a fiber optic connector structure in which a sliding block of a covering member slides in each slot vertically to retain a fiber stub and a field fiber. Two resilient extensions of the covering member contact with two contacting portions of a base tightly to offset a gap between the fiber stub and the field fiber. Hence, optical signals refract through the fiber stub and the field fiber to prevent a matching fluid from leakage and evaporation, thus avoiding a loss of the optical signals.

Another objective of the present invention is to provide a fiber optic connector structure in which the sliding block of the covering member is fitted with each slot of the base. When the sliding block of the covering member is forced by a fitting sleeve to slide from an opening of each slot to a bottom portion of a respective one of the at least one slot, the sliding block is calibrated and retains the fiber stub and the field fiber evenly, so that the fiber stub and the field fiber align and connect with each other arcuately, thus increasing connecting precision.

To obtain the above objectives, a fiber optic connector contains a base, a covering member, and a fitting sleeve.

The base extends along an axial direction and includes a holding face defined thereon, two contacting portions formed on two sides of the axial direction of the holding face, and at least one slot defined between the two contacting portions and extending along the axial direction. A respective one of the at least one slot has an opening extending toward a radial direction and has a bottom portion opposite to the opening. The bottom portion of the respective one of the at least one slot has at least one notch defined therein, and a respective one of the at least one notch has a first inserting segment and a second inserting segment arranged on two ends thereof. The first inserting segment is used to insert a fiber stub, and the fiber stub is further inserted into the respective one of the at least one notch. The second inserting segment is used to insert a field fiber, and the field fiber is further inserted into the respective one of the at least one notch, such that the field fiber aligns and connects with the fiber stub.

The covering member is covered on the holding face of the base and includes two resilient extensions corresponding to the two contacting portions of the base, and a sliding block extending downwardly from the covering member and sliding in the at least one slot. The sliding block slides from the opening to the bottom portion.

The fitting sleeve is fitted on the base and the covering member, and provides a force on the sliding block of the covering member, so that the sliding block slides to the bottom portion of the respective one of the at least one slot along the radial direction. Hence, the sliding block retains the fiber stub and the field fiber, and the two resilient extensions force an elastic reaction to the two contacting portions of the base, thus contacting the two resilient extensions with the two contacting portions tightly.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

With reference to FIGS. 4-9A, a fiber optic connector structure according to a preferred embodiment of the present invention comprises a base 10, a covering member 20, and a fitting sleeve 30.

The base 10 extends along an axial direction X and includes a holding face 11 defined thereon, two contacting portions 12 formed on two sides of the axial direction X of the holding face 11, and at least one slot 13 defined between the two contacting portions 12 and extending along the axial direction X. A respective one of the at least one slot 13 has an opening 131 extending toward a radial direction Y and has a bottom portion 132 opposite to the opening 131. The bottom portion 132 of the respective one of the at least one slot 13 has at least one notch 14 defined therein, and a respective one of the at least one notch 14 has a first inserting segment 141 and a second inserting segment 142 arranged on two ends thereof. The first inserting segment 141 is used to insert a fiber stub 40 which is assembled at a factory beforehand, and the fiber stub 40 is further inserted into the respective one of the at least one notch 14. The second inserting segment 142 is used to insert a field fiber 50 which is assembled at the scene, and the field fiber 50 is further inserted into the respective one of the at least one notch 14, such that the field fiber 50 aligns and connects with the fiber stub 40. Between the fiber stub 40 and the field fiber 50 is fed matching fluid 60 to offset a gap between the fiber stub 40 and the field fiber 50. Hence, optical signals refract through the fiber stub 40 and the field fiber 50 to prevent optical signal loss.

The covering member 20 is covered on the holding face 11 of the base 10 and includes two resilient extensions 21 corresponding to the two contacting portions 12 of the base 10, and a sliding block 22 extending downwardly from the covering member 20 and sliding in the at least one slot 13. The sliding block 22 slides from the opening 131 to the bottom portion 132. In addition, the covering member 20 also includes a rib 23 extending from one end thereof opposite to the sliding block 22 and along the axial direction X. The rib 23 has a releasing section 231 disposed on one side thereof, and a retaining section 232 mounted on another end thereof opposite to the releasing section 231. A height of the releasing section 231 is lower than that of the retaining section 232, and between the releasing section 231 and the retaining section 232 is defined a tilted face 233.

The fitting sleeve 30 is movable and includes a hole 31 defined therein, and a recess 32 formed in the hole 31 and corresponding to the rib 23 of the covering member 20, such that the fitting sleeve 30 is fitted on the base 10 and the covering member 20 by ways of the hole 31 and slides along the axial direction X.

When the fiber optic connector structure connects with the field fiber 50, the fitting sleeve 30 slides to the releasing section 231 of the rib 23 of the covering member 20, so that the recess 32 of the fitting sleeve 30 slightly releases from the rib 23 of the covering member 20. Hence, the field fiber 50 is inserted into the respective one of the at least one notch 14 from the second inserting segment 142 of the respective one of the at least one notch 14 and aligns with the fiber stub 40. Thereafter, the fitting sleeve 30 slides to the retaining section 232 of the rib 23 via the tilted face 233 of the rib 23, so that the recess 32 of the fitting sleeve 30 retains with the rib 23 of the covering member 20. Hence, a force generates on the sliding block 22 of the covering member 20, so that the sliding block 22 slides to the opening 131 of the respective one of the at least one slot 13 along the radial direction Y. Hence, the sliding block 22 retains the fiber stub 40 and the field fiber 50 in the respective one of the at least one notch 14, and the two resilient extensions 21 force an elastic reaction to the two contacting portions 12 of the base 10, thus contacting the two resilient extensions 21 with the two contacting portions 12 tightly.

Figure 1:
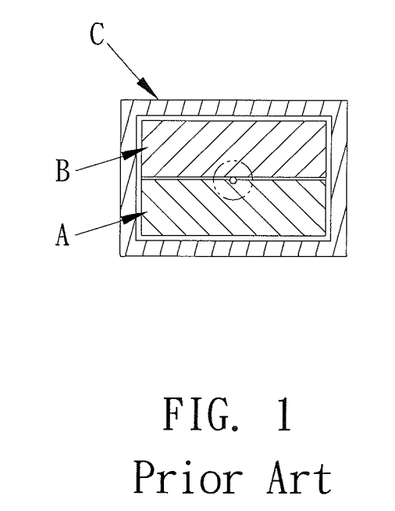
FIG. 1 is a cross sectional view of one conventional fiber optic connector structure.
Figure 1A:
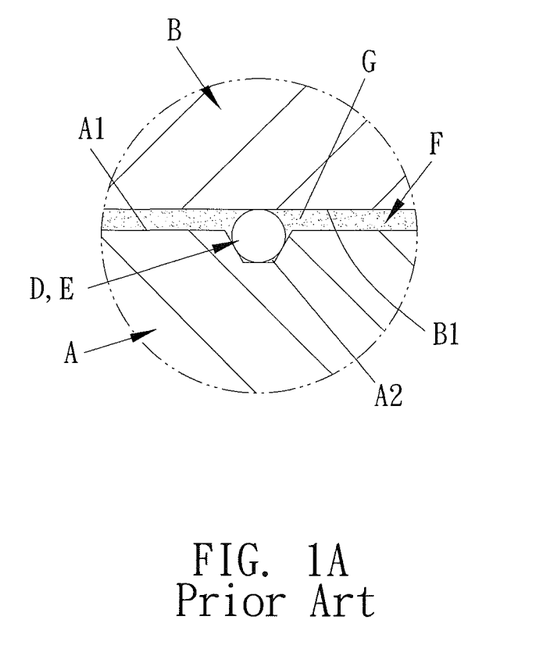
FIG. 1A is a partially amplified cross sectional view of one conventional fiber optic connector structure.
Figure 2:
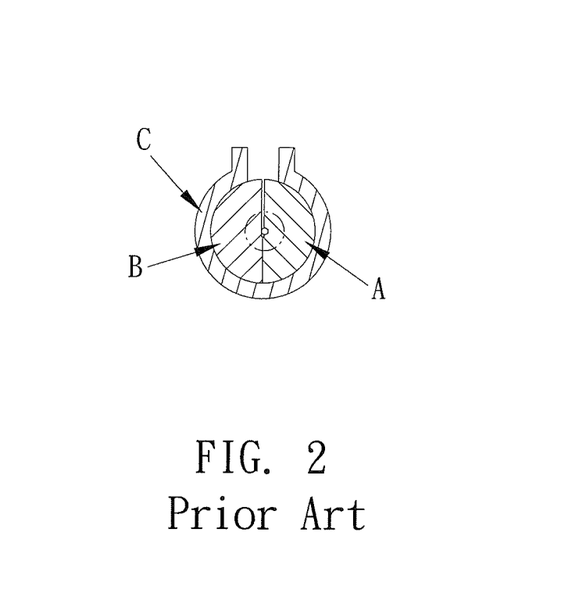
FIG. 2 is a cross sectional view of another conventional fiber optic connector.
Figure 2A:
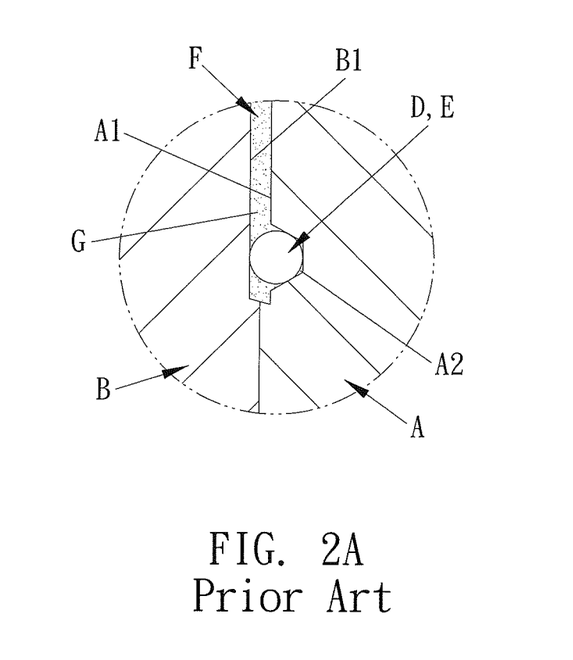
FIG. 2A is a partially amplified cross sectional view of another conventional fiber optic connector.
Figure 3:
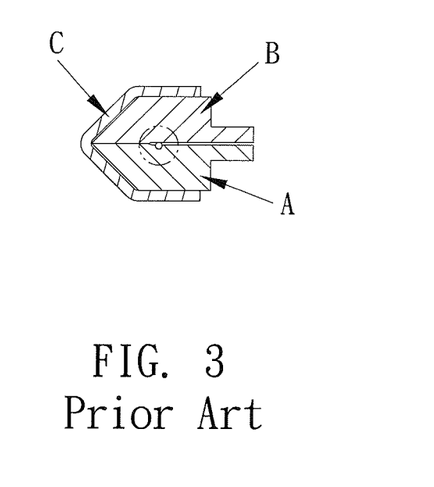
FIG. 3 is a cross sectional view of the other conventional fiber optic connector structure.
Figure 3A:
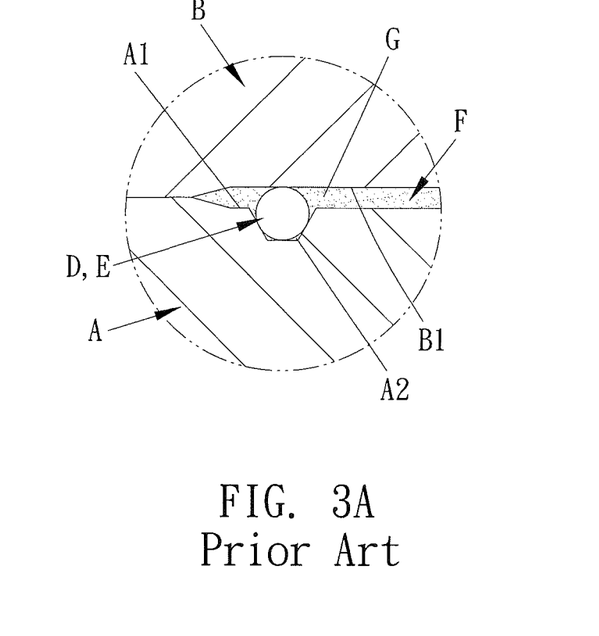
FIG. 3A is a partially amplified cross sectional view of the other conventional fiber optic connector structure.
Figure 4:
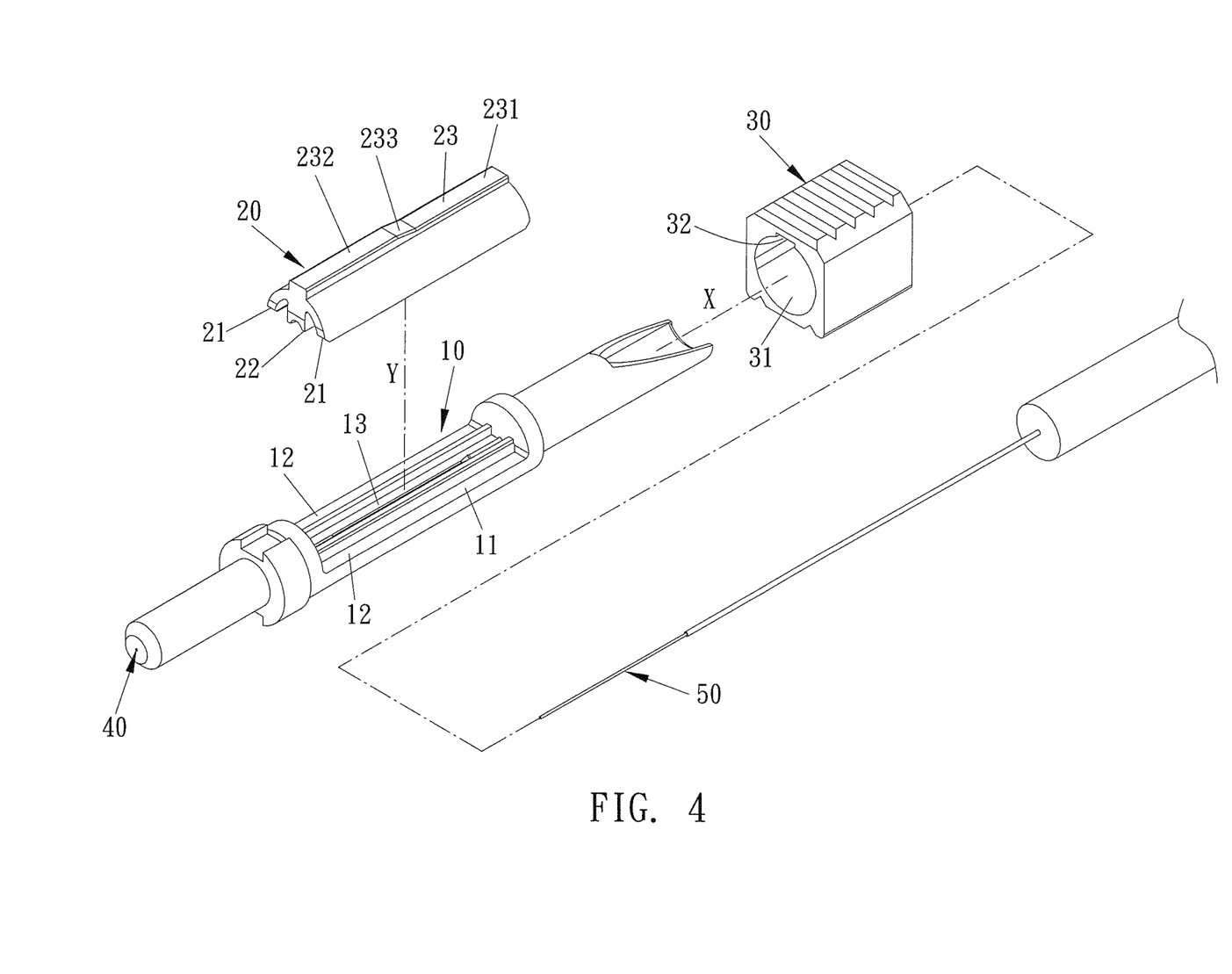
FIG. 4 is a perspective view showing the exploded components of a fiber optic connector structure according to a first embodiment of the present invention structure.
Figure 5:
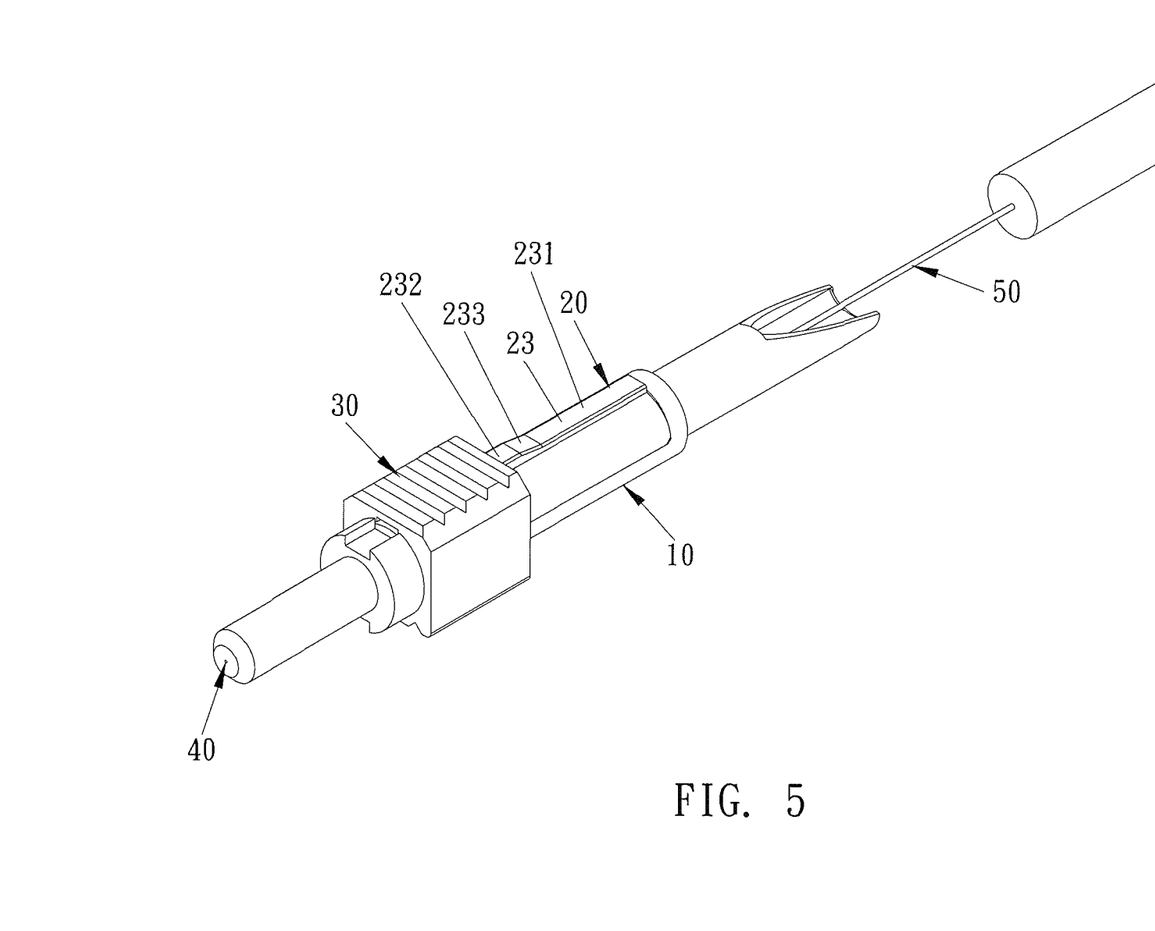
FIG. 5 is a perspective view showing the operation of the fiber optic connector structure according to the first embodiment of the present invention.
Figure 6:
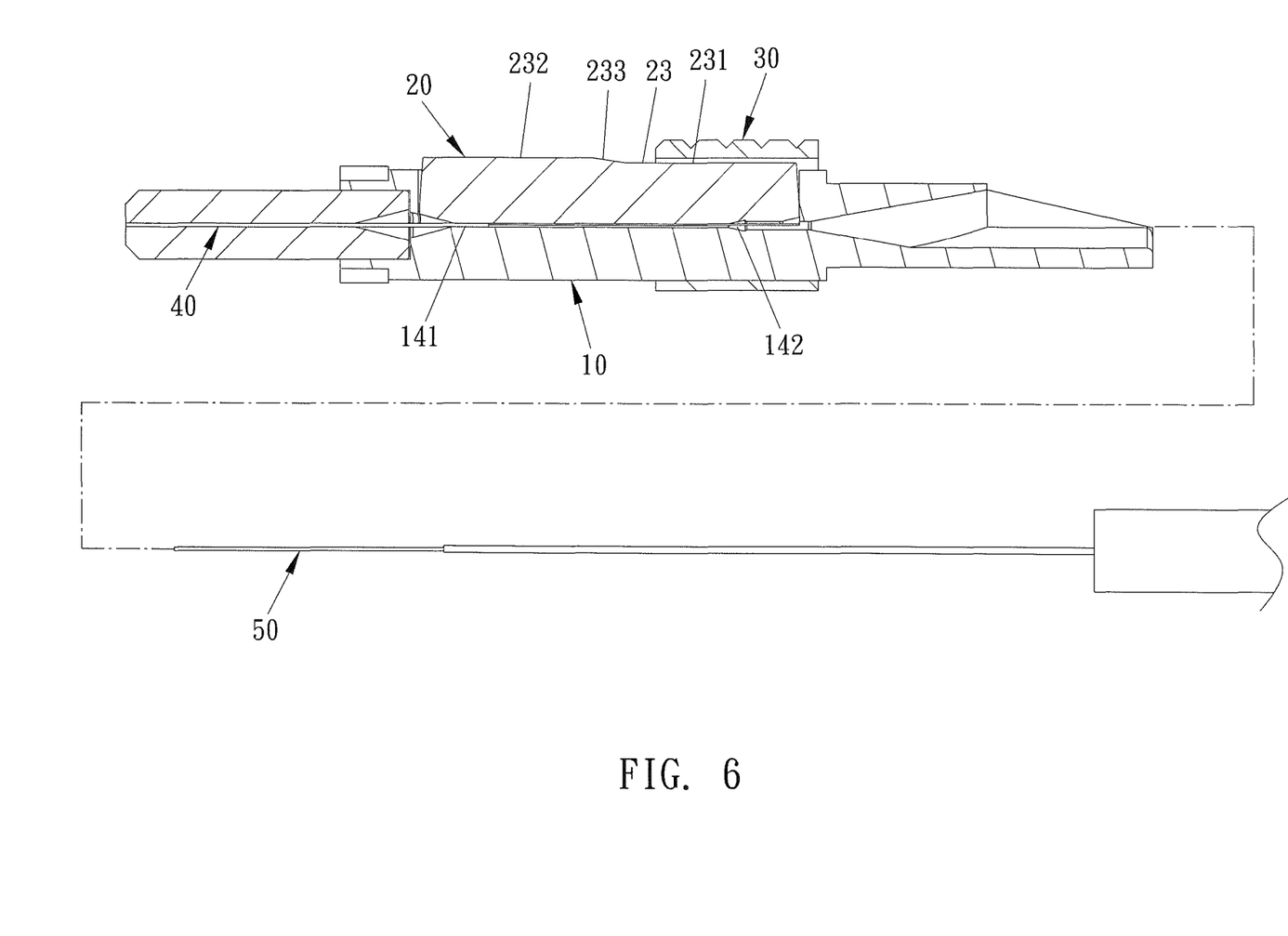
FIG. 6 is a cross sectional view showing the operation of the fiber optic connector structure according to the first embodiment of the present invention.
Figure 7:
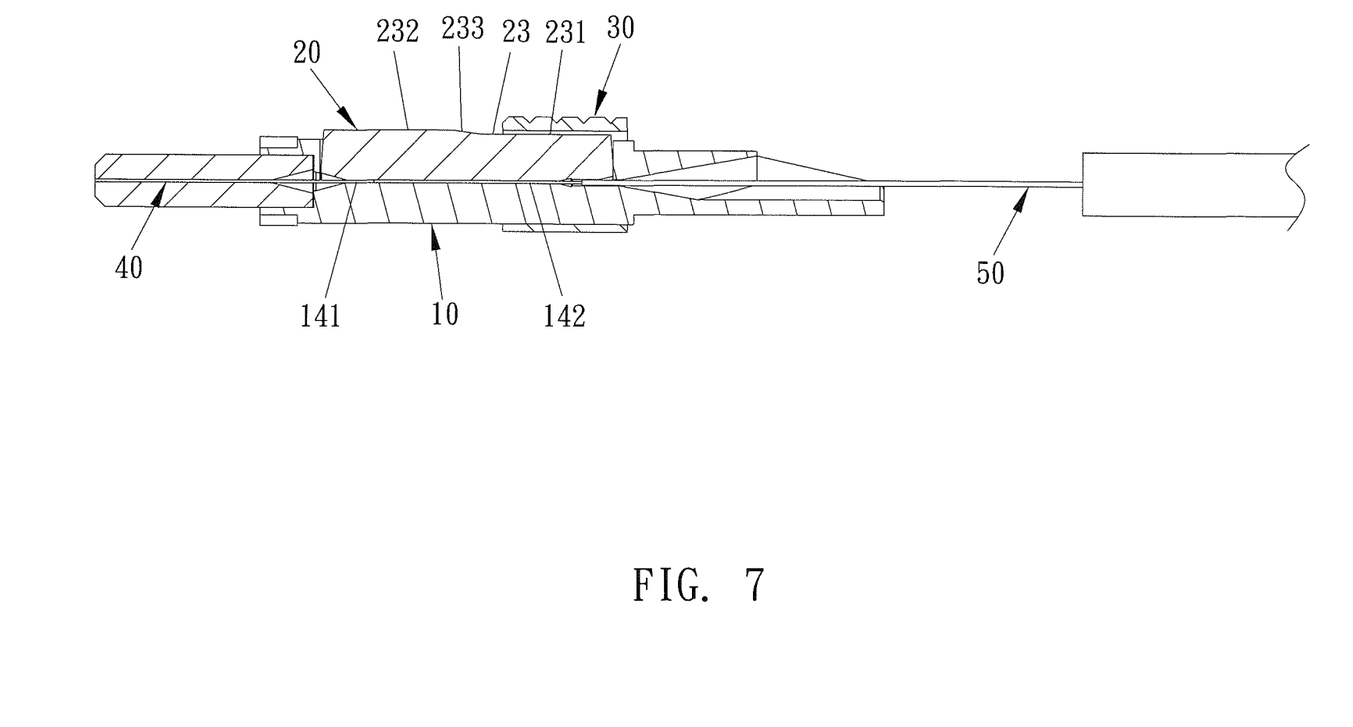
FIG. 7 is another cross sectional view showing the operation of the fiber optic connector structure according to the first embodiment of the present invention.
Figure 8:
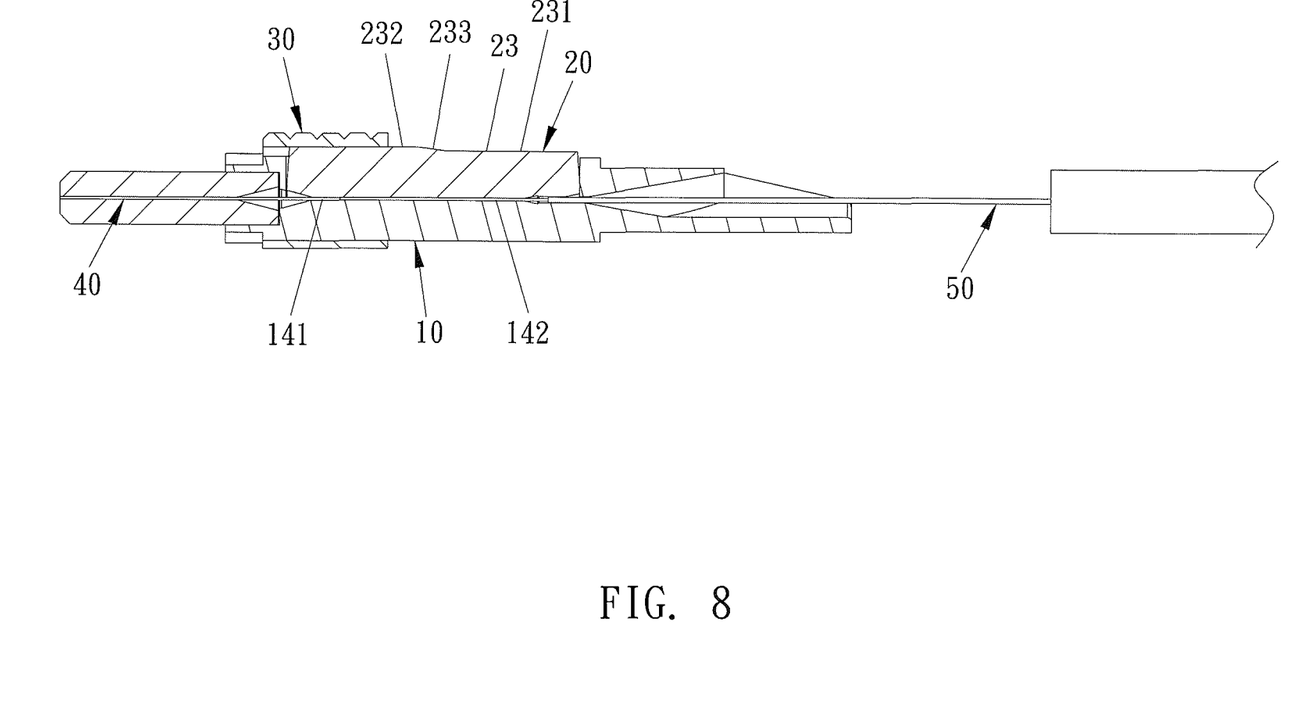
FIG. 8 is also another cross sectional view showing the operation of the fiber optic connector structure according to the first embodiment of the present invention.
Figures 9, 9A:
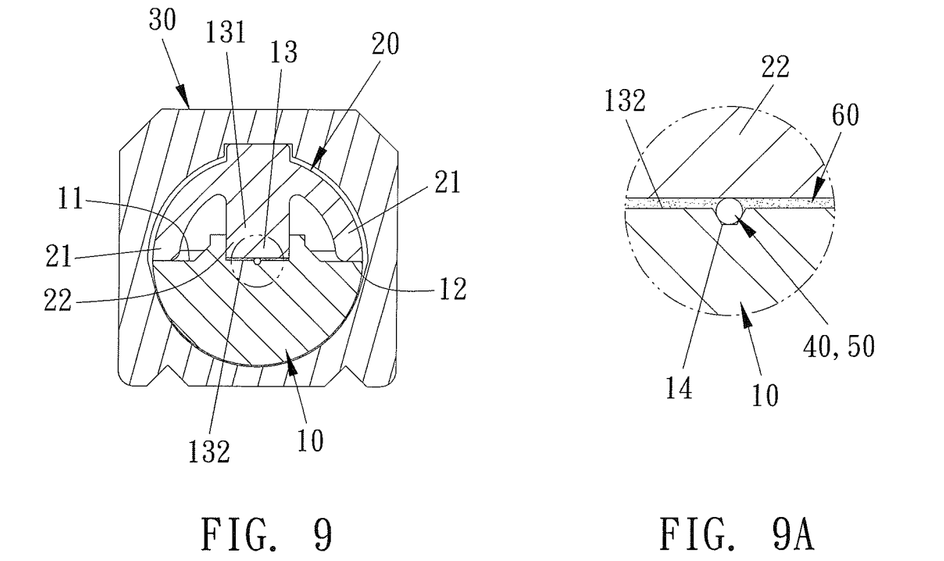
FIG. 9 is a cross sectional view showing the operation of the fiber optic connector structure according to the first embodiment of the present invention.
FIG. 9A is a partially amplified cross sectional view showing the operation of the fiber optic connector structure according to the first embodiment of the present invention.
Figure 10:
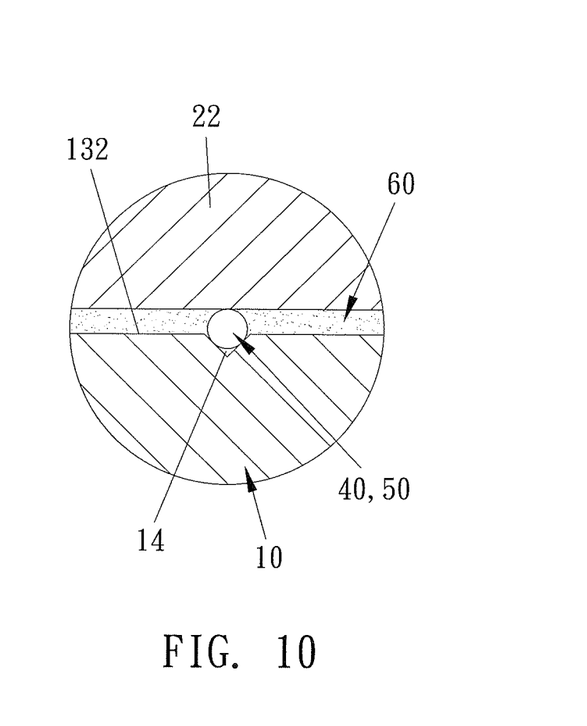
FIG. 10 is a cross sectional view showing a part of the assembly of a fiber optic connector structure according to a second embodiment of the present invention.
Figure 11:
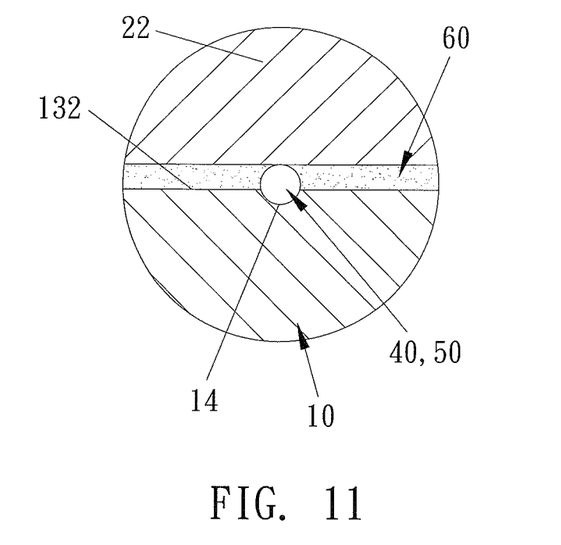
FIG. 11 is a cross sectional view showing a part of the assembly of a fiber optic connector structure according to a third embodiment of the present invention.
Figure 12:
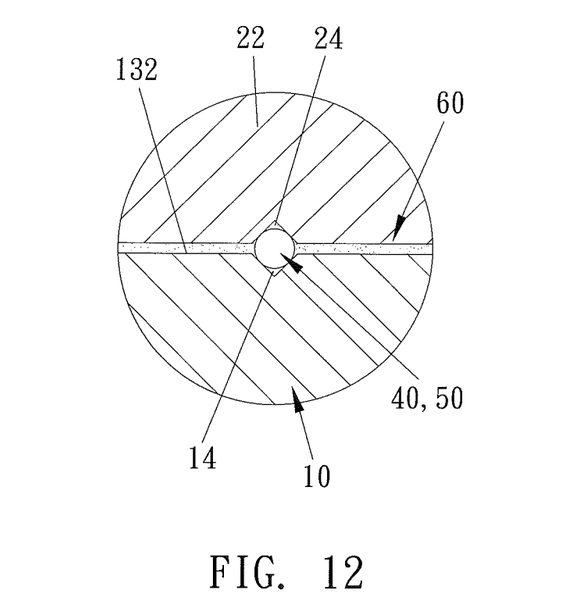
FIG. 12 is a cross sectional view showing a part of the assembly of a fiber optic connector structure according to a fourth embodiment of the present invention.

Likewise, the respective one of the at least one notch 14 of the base 10 is formed in a U shape as shown in FIGS. 9 and 9A, the respective one of the at least one notch 14 is formed in a V shape as shown in FIG. 10, or the respective one of the at least one notch 14 is formed in a semi-circle shape as shown in FIG. 11. Besides, as illustrated in FIG. 12, the respective one of the at least one notch 14 is formed in a V shape, and the covering member 20 has an inverted-V abutting slot 24 to match with the sliding block 22 of the covering member 20 and the respective one of the at least one notch 14 which is formed in a V shape, such that the abutting slot 24 and the respective one of the at least one notch 14 retain the fiber stub 40 and the field fiber 50.

Figure 13:
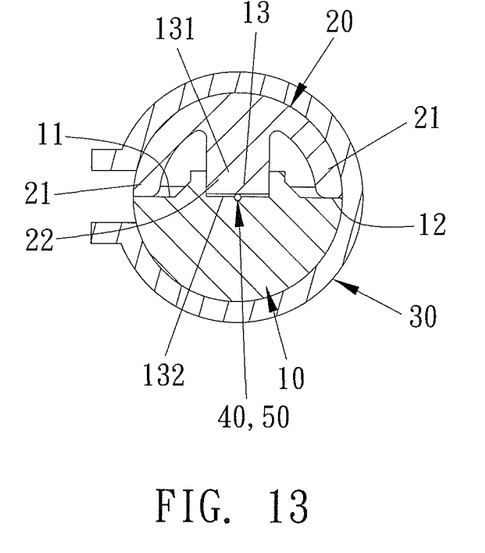
FIG. 13 is a cross sectional view showing a part of the assembly of a fiber optic connector structure according to a fifth embodiment of the present invention.

Referring further to FIG. 13, the fitting sleeve 30 is a C-retaining ring retained on the base 10 and the covering member 20. It is to be noted that the fitting sleeve 30 (i.e., C-retaining ring) resiliently forces the covering member 20 to engage the base 10 in a normal state. While fixing the field fiber 50, the fitting sleeve 30 (i.e., C-retaining ring) is expended to disengage from the covering member 20. Hence, the field fiber 50 is inserted into the respective one of the at least one notch 14 to align and connect with the fiber stub 40 further.

Figure 14:
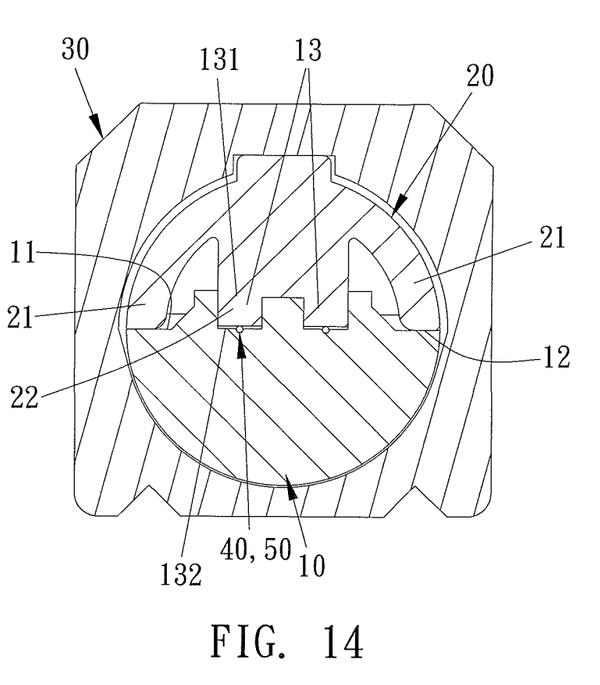
FIG. 14 is a cross sectional view showing a part of the assembly of a fiber optic connector structure according to a sixth embodiment of the present invention.

With reference to FIG. 14, the base 10 includes two slots 13 defined between the two contacting portions 12 and extending along the axial direction X. Each slot 13 has an opening 131 extending toward a radial direction Y and has a bottom portion 132 opposite to the opening 131. The bottom portion 132 of the each slot 13 has at least one notch 14 defined therein. The covering member 20 includes two sliding blocks 22 extending downwardly therefrom and sliding in the two slots 13. The two sliding blocks 22 slide from two openings 131 of the two slots 13 to two bottom portions 132 of the two slots 13.

Thereby, the fiber optic connector structure of the present invention has the following advantages:

1. The sliding block 22 of the covering member 20 slides in each slot 13 vertically to retain the fiber stub 40 and the field fiber 50, and the two resilient extensions 21 of the covering member 20 contact with the two contacting portions 12 of the base 10 tightly to offset the gap between the fiber stub 40 and the field fiber 50. Hence, the optical signals refract through the fiber stub 40 and the field fiber 50 to prevent the matching fluid 60 from leakage and evaporation, thus avoiding a loss of the optical signals.

2. The sliding block 22 of the covering member 20 is fitted with each slot 13 of the base 10. When the sliding block 22 of the covering member 20 is forced by the fitting sleeve 30 to slide from the opening 131 of each slot 13 to the bottom portion 132 of the respective one of the at least one slot 13, the sliding block 22 is calibrated and retains the fiber stub 40 and the field fiber 50 evenly, so that the fiber stub 40 and the field fiber 50 align and connect with each other arcuately, thus increasing connecting precision.

While various embodiments in accordance with the present invention have been shown and described, it is clear to those skilled in the art that further embodiments may be made without departing from the scope of the present invention.

What is claimed is:

1. A fiber optic connector structure comprising:
a base extending along an axial direction and including: a holding face defined thereon, two contacting portions formed on two sides of the axial direction of the holding face, and at least one slot defined between the two contacting portions and extending along the axial direction, wherein a respective one of the at least one slot has an opening extending toward a radial direction and has a bottom portion opposite to the opening, wherein the opening is spaced in the radial direction from the two contacting portions and the bottom portion, wherein the slot has a slot width between the two contacting portions, wherein the bottom portion of the respective one of the at least one slot has at least one notch defined therein, wherein the notch has a notch width parallel to and less than the slot width, wherein a respective one of the at least one notch has a first inserting segment and a second inserting segment arranged on two ends thereof, wherein the first inserting segment is used to insert a fiber stub, wherein the fiber stub is further inserted into the respective one of the at least one notch, wherein the second inserting segment is used to insert a field fiber, wherein the field fiber is further inserted into the respective one of the at least one notch, and wherein the field fiber aligns and connects with the fiber stub;
a covering member covered on the holding face of the base and including: two resilient extensions corresponding to the two contacting portions of the base, and a sliding block located intermediate the two resilient extensions, extending downwardly from the covering member, extending through the opening, and having a block width generally equal to and for sliding in the at least one slot in the axial direction, wherein the sliding block extends from the opening to the bottom portion, with the block width greater than the notch width; and
a fitting sleeve fitted on the base and the covering member, and providing a force on the sliding block of the covering member so that the sliding block slides to the bottom portion of the respective one of the at least one slot along the radial direction, wherein the sliding block retains the fiber stub and the field fiber, and wherein the two resilient extensions force an elastic reaction to the two contacting portions of the base, thus contacting the two resilient extensions with the two contacting portions tightly.

2. The fiber optic connector structure as claimed in claim 1, wherein between the fiber stub and the field fiber is fed a matching fluid.

3. The fiber optic connector structure as claimed in claim 1, wherein the covering member also includes a rib extending from one end thereof opposite to the sliding block and along the axial direction, and wherein the fitting sleeve is movable and includes: a hole defined therein, and a recess formed in the hole and corresponding to the rib of the covering member.

4. The fiber optic connector structure as claimed in claim 3, wherein the rib has a releasing section disposed on one side thereof, and a retaining section mounted on another end thereof opposite to the releasing section, wherein a height of the releasing section is lower than that of the retaining section, and wherein between the releasing section and the retaining section is defined a tilted face.

5. The fiber optic connector structure as claimed in claim 1, wherein the respective one of the at least one notch of the base is formed in a U shape.

6. The fiber optic connector structure as claimed in claim 1, wherein the respective one of the at least one notch is formed in a V shape.

7. The fiber optic connector structure as claimed in claim 1, wherein the respective one of the at least one notch is formed in a semi-circle shape.

8. The fiber optic connector structure as claimed in claim 1, wherein the respective one of the at least one notch is formed in a V shape, and wherein the covering member has an inverted-V abutting slot to match with the respective one of the at least one notch which is formed in the V shape.

9. The fiber optic connector structure as claimed in claim 1, wherein the fitting sleeve is a C-retaining ring.

* * * * *